S. B. THOMPSON.
CAR BRAKE MECHANISM.
APPLICATION FILED APR. 5, 1909.
935,176.
Patented Sept. 28, 1909.
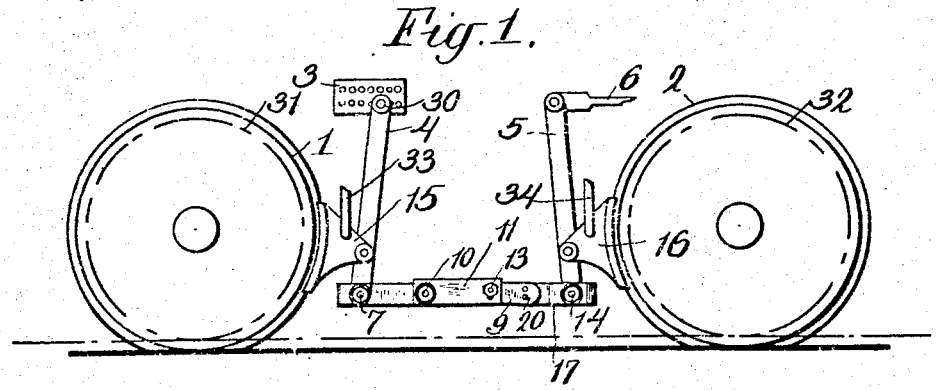
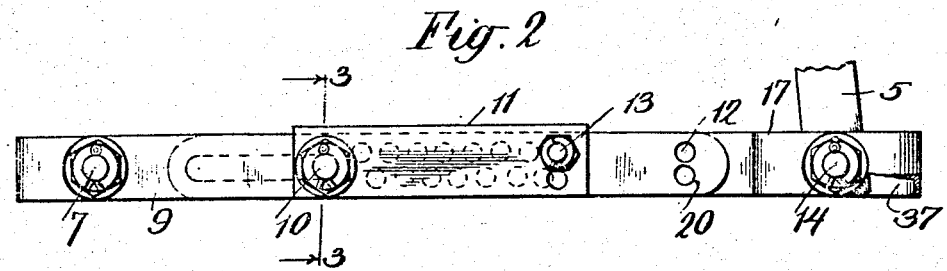
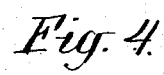
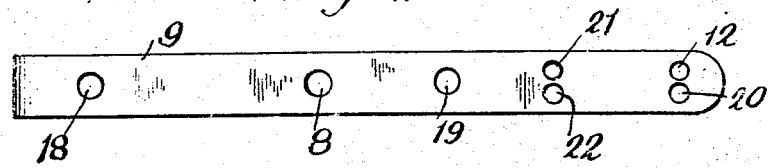
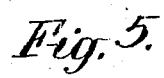
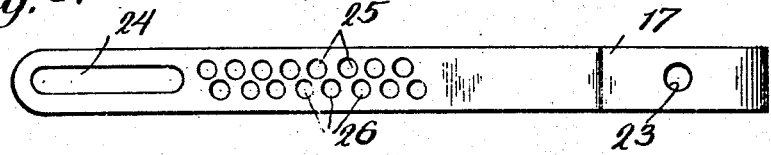
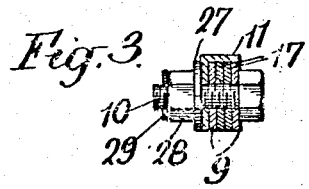
WITNESSES
Samuel B Thompson INVENTOR
BY
Duncan & Duncan ATTORNEYS

UNITED STATES PATENT OFFICE.

SAMUEL B. THOMPSON, OF FANWOOD, NEW JERSEY.

CAR-BRAKE MECHANISM 935,176.                Specification of Letters Patent.     Patented Sept. 28, 1909.

Application filed April 5, 1909. Serial No. 487,854.

*To all whom it may concern:*

Be it known that I, SAMUEL B. THOMPSON, a citizen of the United States, and resident of Fanwood, Union county, State of New Jersey, have made certain new and useful Inventions Relating to Car-Brake Mechanism, of which the following is a specification, taken in connection with the accompanying drawing, forming part of the same.

This invention relates to car brake mechanism and relates especially to brake mechanism for electric or other railway cars in which the adjustable brake link comprises an adjusting bar having an end encircling one of the brake levers and a coöperating strap similarly encircling the other brake lever at one end, said strap and adjusting bar being rigidly secured in adjusted position as by a clamping bolt and adjusting pin engaging suitable apertures in said members and holding them rigid in connection if desired with a suitable aliner, so that the brake link has a wide range of adjustment to compensate for wear and is rigidly held in adjusted position under working conditions.

In the accompanying drawing showing in a somewhat diagrammatic manner an illustrative embodiment of this invention and in which the same reference numeral refers to similar parts in the several figures, Figure 1 is a side view showing the brake mechanism. Fig. 2 is an enlarged side view of the adjustable brake link. Fig. 3 is a transverse section thereof along the lines 3—3 of Fig. 2. Fig. 4 is a separate side view of the strap. Fig. 5 is a similar view of the adjusting bar.

As indicated in the illustrative embodiment of this invention the brake shoe 15 may be mounted on the hanger 33 pivotally mounted on the truck frame or in any desired way to coöperate with the tread 1 of the car wheel, the shoe 16 being indicated as similarly mounted on the hanger 34 so as to coöperate with the tread wheel 2. The brake mechanism comprises the brake levers 4, 5 which may be connected to any desired part of the brake device operating the brake shoes, as for instance, by pivotally connecting said levers to the brake shoes themselves as indicated. The brake lever 4 may have its pivot 30 mounted in any one of the holes in the fulcrum plate 3 on the truck frame and may be connected by the lever pivot 7 to one member of the adjustable brake link below the other member of which may be similarly connected by the pivot 14 to the brake lever 5 actuated in any desired way, as by the pull rod 6.

The adjustable brake link, as indicated, comprises the adjusting bar 17 which may be formed of a heavy strip of metal doubled back upon itself so as to form the suitable lever socket 37 to accommodate the brake lever 5 and hold the same in alinement. The coöperating member of the brake link may consist of a suitable strap, such as 9, formed of metal strip and bent to form a similar lever socket accommodating the brake lever 4, the free ends of this strap preferably inclosing the end of the adjusting bar, as is indicated in Fig. 3. These two link members may be held in adjusted position by any desired means, as for instance, the clamping bolt 10 and the adjusting pin 13 which rigidly hold these members in adjusted position as well as clamping thereto a suitable aliner 11 of angle iron as indicated in Fig. 3, which may be employed if desired to further stiffen and aline the members of this adjustable brake link. For this purpose the strap may be formed with a series of widely spaced clamping holes 8, 19 to accommodate the clamping bolt 10 and with a plurality of sets of similarly spaced adjusting holes 12, 20, 21, 22, to accommodate the adjusting pin. The adjusting bar may if desired be provided with a suitable aperture in the form of the clamping slot 24 to accommodate the clamping bolt and with a plurality of closely spaced adjusting apertures 25, 26 for the pin. By having any desired number of rows of these adjusting apertures arranged in staggered position and a corresponding number of coöperating adjusting holes the desired fineness of adjustment may be secured while maintaining the alinement of the link members. For instance, when the pin is in the corresponding lower adjusting hole 22 one of the adjusting apertures 26 may be used for intermediate adjustments while maintaining the alinement of the brake link members, although of course this is not necessary in all cases. In Figs. 1 and 2 the brake link is shown in retracted position, the adjusting bar and coöperating strap overlapping to the greatest extent, the adjusting pin being in the hole 21 in the strap and in the inner adjusting aperture 25. As wear takes place and it becomes necessary to correspondingly adjust the length of the brake link it is only necessary to remove the adjusting pin 13, loosen the clamping bolt and after extending the link members to the desired extent insert the adjusting pin 13 in the hole 21 and the next adjusting aperture 25 for example, if so much extension is desired. During this adjustment the clamping bolt slides a corresponding distance in the clamping slot 24 and is tightened to clamp the parts together after the adjusting pin has been tightened. Similar adjustments of the brake link may take place, the pin engaging in one of the series of adjusting apertures in the adjusting bar until the inner aperture has been reached. Thereupon it becomes necessary to use the clamping pin in connection with another series of adjusting holes in the strap, of which of course any desired number may be employed while the clamping bolt is similarly transferred to another clamping hole. For example, the adjusting pin may be withdrawn from the adjusting hole 22 and inserted in the adjusting hole 20 and thereupon it can engage one of the inner adjusting apertures 26 and allow further step-by-step adjustments to be similarly made, the clamping bolt being at the same time transferred from the clamping hole 8 to the clamping hole 19 in which position the coöperating link members may be rigidly held together so as to assure the reliable and proper operation of the brake mechanism, even after extreme wear has taken place on the car wheels, so that the treads are as indicated by the dotted lines 31, 32.

It is of course desirable to employ suitable locking devices in connection with the adjusting pin and clamping bolt, the latter as indicated in Fig. 3 being provided with a suitable washer 27 and nut 28 which in connection with the bolt head allows the parts to be tightly clamped together in which position they may be securely held by the split pin fastener 29 or other suitable locking device which may also be employed on the adjusting pin and lever pivots 7, 14. These lever pivots pass through the pivot holes 18 and 23 in the ends of the adjustable link so as to form a bearing for the ends of the brake levers which are in loose lateral engagement with the lever sockets 37 so as to maintain alinement of the parts. By employing a suitable aliner, such as 11, the parts are more rigidly held in position and lateral bending of the link correspondingly minimized. Furthermore, in such case either the clamping bolt or adjusting pin is sufficient to maintain the link members sufficiently in position so as to prevent either member dropping out of line into engagement with the roadbed.

Having described this invention in connection with an illustrative embodiment thereof, to the details of which disclosure the invention is not of course to be limited, what is claimed as new and what is desired to be secured by Letters Patent is set forth in the appended claims.

1. In car brake mechanism, brake levers, brake devices comprising brake shoes connected to said brake levers, one of which said brake levers being connected to a fulcrum plate, brake operating mechanism to actuate the other of said levers, an adjustable brake link pivotally connecting the lower ends of said brake levers, said brake link comprising an adjusting bar formed of doubled metal strip to form a lever socket accommodating, laterally engaging and alining the connected brake lever said adjusting bar being formed with a longitudinal clamping slot and with a plurality of rows of staggered adjusting apertures, a strap formed of doubled strip metal to provide a similar lever socket and to inclose said adjusting bar, said strap being formed with a plurality of spaced clamping holes and with a plurality of sets of spaced adjusting holes corresponding with said adjusting apertures in said bar, an L-sectioned aliner engaging and alining said strap and bar, a clamping bolt engaging one of said clamping holes and said clamping slot and an adjusting pin engaging one of said adjusting holes and adjusting apertures to allow the step-by-step adjustment of the length of said brake link, said clamping bolt and said adjusting pin holding said strap, bar and aliner together to rigidly hold said brake link members in adjusted position.

2. In car brake mechanism, brake levers, connected brake devices comprising brake shoes operated by said levers, an adjustable brake link pivotally connected to said brake levers, said brake link comprising an adjusting bar formed of doubled metal strip to provide a lever socket accommodating, laterally engaging and alining the connected brake lever, said adjusting bar being formed with a clamping slot and with a plurality of rows of staggered adjusting apertures, a strap formed of doubled strip metal to provide a similar lever socket and to inclose said adjusting bar, said strap being formed with a plurality of spaced clamping holes and with a plurality of sets of spaced adjusting holes corresponding with said adjusting apertures in said bar, an aliner engaging and alining said strap and bar, a clamping bolt engaging one of said clamping holes and said clamping slot and an adjusting pin engaging one of said adjusting holes and adjusting apertures to allow the step-by-step longitudinal adjustment of said brake link and hold the members thereof in adjusted position.

3. In car brake mechanism, brake levers and connected brake devices operated thereby and an adjustable brake link connected to said brake levers, said brake link comprising an adjusting bar formed with a longitudinal clamping slot and with a plurality of adjusting apertures, a coöperating strap engaging said adjusting bar and formed with a plurality of spaced clamping holes and with a plurality of adjusting holes coöperating with said adjusting apertures in said bar, a clamping bolt engaging one of said clamping holes and said clamping slot and an adjusting pin engaging one of said adjusting holes and adjusting apertures, to allow the step-by-step longitudinal adjustment of said brake link and hold the members thereof in adjusted position.

4. In car brake mechanism, an adjustable brake link comprising an adjusting bar formed of doubled metal strip to constitute an inclosing lever socket, said adjusting bar being formed with a longitudinal clamping slot and with a plurality of rows of staggered adjusting apertures, a strap formed of doubled strip metal to provide a similar lever socket and to inclose the end of said adjusting bar, said strap being formed with adjusting bar, said strap being formed with a plurality of spaced clamping holes and with a plurality of sets of spaced adjusting holes corresponding with said adjusting apertures in said bar, an L-sectioned aliner engaging and alining said strap and bar, a clamping bolt engaging one of said clamping holes and said clamping slot, an adjusting pin engaging one of said adjusting holes and adjusting apertures to allow the step-by-step longitudinal adjustment of said brake link and rigidly hold the members thereof in adjusted position.

5. In car brake mechanism, an adjustable brake link comprising an adjusting bar formed with an inclosing lever socket adjacent one end and with a longitudinal clamping slot and a plurality of rows of staggered adjusting apertures, a coöperating strap formed of doubled strip metal to provide a lever socket adjacent one end, said strap being formed with a plurality of spaced clamping holes and with a plurality of sets of similarly spaced adjusting holes corresponding with said adjusting apertures in said bar, a clamping bolt engaging one of said clamping holes and said clamping slot and an adjusting pin engaging one of said adjusting holes and adjusting apertures to allow the step-by-step longitudinal adjustment of said brake link and hold the members thereof in adjusted position.

6. In car brake mechanism, an adjustable brake link comprising an adjusting bar formed with an enlarged clamping aperture and with a plurality of adjusting apertures, a coöperating link member formed with a plurality of spaced clamping holes and with a plurality of similarly spaced adjusting holes corresponding with said adjusting apertures in said bar, a clamping bolt engaging one of said clamping holes and said clamping aperture and an adjusting pin engaging one of said adjusting holes and adjusting apertures to allow the step-by-step longitudinal adjustment of said brake link and hold the members thereof in adjusted position.

7. In car brake mechanism, an adjustable brake link comprising an adjusting bar formed with an enlarged clamping aperture and with a plurality of closely spaced adjusting apertures, a coöperating link member formed with a plurality of widely spaced clamping holes and with a plurality of similarly spaced adjusting holes coöperating with said adjusting apertures in said bar, alining means to laterally aline said link members, a clamping bolt engaging one of said clamping holes and said clamping aperture and an adjusting pin engaging one of said adjusting holes and adjusting apertures to allow the step-by-step longitudinal adjustment of said brake link.

8. In car brake mechanism, an adjustable brake link comprising an adjusting bar formed with a lever socket at one end and with an enlarged clamping aperture and with a plurality of closely spaced adjusting apertures, a strap formed of doubled strip metal to provide a lever socket adjacent one end and to inclose the end of said adjusting bar, said strap being formed with a plurality of widely spaced clamping holes and with a plurality of similarly spaced adjusting holes coöperating with said adjusting apertures in said bar, a clamping bolt engaging one of said clamping holes and said clamping aperture and an adjusting pin engaging one of said adjusting holes and adjusting apertures to allow the step-by-step longitudinal adjustment of said brake link.

SAMUEL B. THOMPSON.

Witnesses:
HARRY L. DUNCAN,
JESSIE B. KAY.